US011526965B2

(12) United States Patent
Willmott et al.

(10) Patent No.: US 11,526,965 B2
(45) Date of Patent: Dec. 13, 2022

(54) MULTIPLICATIVE FILTER NETWORK

(71) Applicant: Robert Bosch GmbH, Stuttgart (DE)

(72) Inventors: Devin Willmott, Pittsburgh, PA (US); Anit Kumar Sahu, Pittsburgh, PA (US); Rizal Fathony, Pittsburgh, PA (US); Filipe Cabrita Condessa, Pittsburgh, PA (US); Jeremy Zieg Kolter, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 17/034,496

(22) Filed: Sep. 28, 2020

(65) Prior Publication Data

US 2022/0101496 A1 Mar. 31, 2022

(51) Int. Cl.
*G06T 5/00* (2006.01)
*G06F 17/11* (2006.01)
*G06N 3/04* (2006.01)
*G06F 17/14* (2006.01)

(52) U.S. Cl.
CPC ............. *G06T 5/002* (2013.01); *G06F 17/11* (2013.01); *G06F 17/147* (2013.01); *G06N 3/0454* (2013.01); *G06T 2207/20048* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 9,904,874 B2* | 2/2018 | Shoaib | G06V 30/194 |
| 11,049,013 B1* | 6/2021 | Duong | G06N 3/063 |
| 2004/0078403 A1* | 4/2004 | Scheuermann | H03H 21/0012 |
| | | | 708/322 |
| 2017/0011288 A1* | 1/2017 | Brothers | G06F 9/3017 |

(Continued)

OTHER PUBLICATIONS

Sitzmann, Vincent, et al. "Implicit neural representations with periodic activation functions." Advances in Neural Information Processing Systems 33 (2020): 7462-7473. (Year: 2020).*

(Continued)

*Primary Examiner* — Andrae S Allison
(74) *Attorney, Agent, or Firm* — Kathy Takeguchi (57) ABSTRACT

A computer-implemented method includes applying a filter to input data based on an initial set of parameters to generate an initial feature map. The filter is configured to activate a filter function that involves a periodic function. The method includes performing a first linear transform on the initial feature map based on a subset of a first set of parameters to generate a first linear transform. The method includes applying the filter to the input data based on another subset of the first set of parameters to generate a first feature map. The method includes performing a multiplicative operation on the first linear transform and the first feature map to generate a first product. The method includes performing a second linear transform on the first product based on a subset of a second set of parameters to generate a second linear transform. The method includes generating output data that takes into account at least the second linear transform. The output data is a quantity of interest that is generated with high fidelity. The output data is specified by the input data over a space that defines the output data.

23 Claims, 5 Drawing Sheets

(56) References Cited

U.S. PATENT DOCUMENTS

| | | | |
|---|---|---|---|
| 2018/0046900 A1* | 2/2018 | Dally | G06F 9/30018 |
| 2018/0197068 A1* | 7/2018 | Narayanaswami | G06F 13/28 |
| 2018/0246855 A1* | 8/2018 | Redfern | G06F 3/0613 |
| 2020/0380363 A1* | 12/2020 | Kwon | G06N 3/082 |

OTHER PUBLICATIONS

Sitzmann et al., "Implicit Neural Representations with Periodic Activation Functions", arXiv:2006.09661v1 [cs.CV], Jun. 17, 2020, pp. 1-11 and supplemental pp. 1-24.

* cited by examiner

MULTIPLICATIVE FILTER NETWORK

FIELD

This disclosure relates generally to machine learning systems, and more specifically to machine learning systems that are configured to learn and represent signals with high fidelity.

BACKGROUND

In general, artificial neural networks are configured to perform tasks. However, most artificial neural networks are not well suited to handle tasks that involve representing complex natural signals and their derivatives. In this regard, the task of learning and representing signals in fine details is slightly different than the usual classification tasks and/or regression tasks for which most artificial neural networks are known to handle. In this regard, for instance, the task of learning and representing signals may involve obtaining spatial coordinates or spatial-temporal coordinates and providing quantities of interest at those coordinates.

Although there is a sinusoidal representation network (SIREN) that is able to perform such tasks, the SIREN has a number of drawbacks. For example, the SIREN has a neural network architecture that includes many sine activation layers, where one sine activation layer feeds directly into another sine activation layer, which feeds directly into yet another sine activation layer and so forth for all of its sine activation layers in a manner that may negatively affect its speed and/or performance in certain instances. Moreover, the SIREN performs these sine activation operations in a manner that does not have an intuitive interpretation within the context of signal processing.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes obtaining input data. The method includes applying a filter to the input data based on an initial set of parameters to generate an initial feature map. The filter is configured to activate a filter function that involves a periodic function. The method includes performing a first linear transform on the initial feature map based on a subset of a first set of parameters to generate a first linear transform. The method includes applying the filter to the input data based on another subset of the first set of parameters to generate a first feature map. The method includes performing a multiplicative operation on the first linear transform and the first feature map to generate a first product. The method includes performing a second linear transform on the first product based on a subset of a second set of parameters to generate a second linear transform. The method includes generating output data that takes into account at least the second linear transform.

According to at least one aspect, a system includes at least one sensor, at least one non-transitory computer readable storage device, and at least one processor. The sensor is configured to provide sensor data. The one or more non-transitory computer readable storage devices include at least a machine learning system and computer readable data. The computer readable data is executable to perform a method involving the machine learning system. The one or more processors are operably connected to the one or more non-transitory computer readable storage devices. The one or more processors are configured to execute the computer readable data to perform the method. The method includes obtaining input data based on the sensor data. The method includes applying a filter to the input data based on an initial set of parameters to generate an initial feature map. The filter is configured to activate a filter function that involves a periodic function. The method includes performing a first linear transform on the initial feature map based on a subset of a first set of parameters to generate a first linear transform. The method includes applying the filter to the input data based on another subset of the first set of parameters to generate a first feature map. The method includes performing a multiplicative operation on the first linear transform and the first feature map to obtain a first product. The method includes performing a second linear transform on the first product based on a subset of a second set of parameters to generate a second linear transform. The method includes providing output data that takes into account at least the second linear transform.

According to at least one aspect, a computer product includes at least one non-transitory computer readable storage device that includes computer-readable data, which when executed by one or more electronic processors, is operable to cause the one or more electronic processors to implement a method. The method includes obtaining input data. The method includes applying a filter to the input data based on an initial set of parameters to generate an initial feature map. The filter is configured to activate a filter function that involves a periodic function. The method includes performing a first linear transform on the initial feature map based on a subset of a first set of parameters to generate a first linear transform. The method includes applying the filter to the input data based on another subset of the first set of parameters to generate a first feature map. The method includes performing a multiplicative operation on the first linear transform and the first feature map to generate a first product. The method includes performing a second linear transform on the first product based on a subset of a second set of parameters to generate a second linear transform. The method includes generating output data that takes into account at least the second linear transform.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
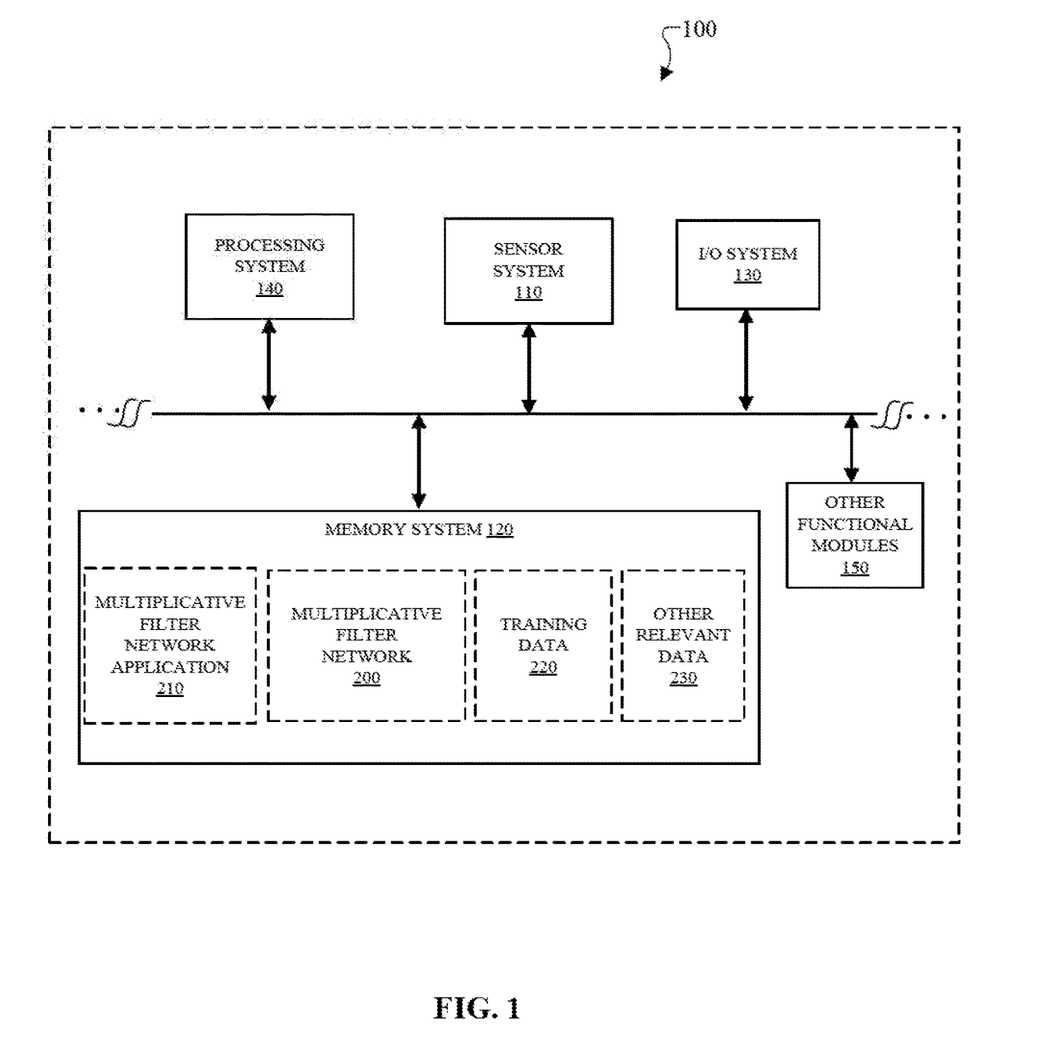
FIG. 1 is a diagram of an example of a system that is configured to at least train a multiplicative filter network according to an example embodiment of this disclosure.

FIG. 1 is a diagram of a system 100 that includes a multiplicative filter network 200 according to an example embodiment. The system 100 is configured to train, implement, or both train and implement at least the multiplicative filter network 200. Alternatively, the system 100 is configured to train the multiplicative filter network 200 and enable the trained multiplicative filter network 200 to be employed and/or deployed in another computer system (not shown). As shown in FIG. 1, the system 100 includes at least a processing system 140. The processing system 140 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 140 is operable to provide the functionality of the multiplicative filter network 200 as described herein.

The system 100 includes at least a memory system 120, which is operatively connected to the processing system 140. In an example embodiment, the memory system 120 includes at least one non-transitory computer readable medium, which is configured to store and provide access to various data to enable at least the processing system 140 to perform the operations and functionalities with respect to the multiplicative filter network 200, as disclosed herein. In an example embodiment, the memory system 120 comprises a single computer readable storage device or a plurality of computer readable storage devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and any combination thereof. With respect to the processing system 140 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 140 and/or other components of the system 100.

The memory system 120 includes at least a multiplicative filter network 200, the multiplicative filter network application 210, training data 220, and other relevant data 230, which are stored thereon. The multiplicative filter network application 210 includes computer readable data that, when executed by the processing system 140, is configured to implement a training procedure to train the multiplicative filter network 200 to provide the functions as described in at least FIG. 2. In this regard, the multiplicative filter network 200 is configured as at least one machine learning system. More specifically, for example, the multiplicative filter network application 210 is configured to train at least multiplicative filter network 200 to generate a quantity of interest (e.g., pixel value) as output data as specified by the input data (e.g., spatial coordinates or spatial-temporal coordinates) over that space that defines the output data. The computer readable data can include instructions, code, routines, various related data, any software technology, or any number and combination thereof.

Also, the training data 220 includes a sufficient amount of various data that can be used to train the multiplicative filter network 200. For example, the training data 220 may include image data, video data, audio data, any sensor-based data, or any suitable type of data. In addition, the training data 220 includes various annotations, various loss data, various parameter data, as well as any related machine learning data that enables the system 100 to multiplicative filter network 200 to perform the functions as described herein while meeting certain performance criteria. Meanwhile, the other relevant data 230 provides various data (e.g. operating system, etc.), which enables the system 100 to perform the functions as discussed herein.

In an example embodiment, as shown in FIG. 1, the system 100 is configured to include at least one sensor system 110. The sensor system 110 includes one or more sensors. For example, the sensor system 110 includes an image sensor, a camera, a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any combination thereof. The sensor system 110 is operable to communicate with one or more other components (e.g., processing system 140 and memory system 120) of the system 100. More specifically, for example, the processing system 140 is configured to obtain the sensor data directly or indirectly from one or more sensors of the sensor system 110. Upon receiving any sensor data during the training process and/or during any implementation process, the processing system 140 is configured to process this sensor data in connection with the multiplicative filter network 200 or both the multiplicative filter network 200 and the multiplicative filter network application 210.

In addition, the system 100 includes other components that contribute to the training and/or implementation of the multiplicative filter network 200. For example, as shown in FIG. 1, the memory system 120 is also configured to store other relevant data 230, which relates to operation of the system 100 in relation to one or more components (e.g., sensor system 110, I/O system 130, and other functional modules 150). In addition, the I/O system 130 includes an I/O interface and may include one or more devices (e.g., display device, keyboard device, speaker device, etc.). Also, the system 1200 includes other functional modules 150, such as any appropriate hardware technology, software technology, or combination thereof that assist with or contribute to the functioning of the system 100. For example, the other functional modules 150 include communication technology that enables components of the system 100 to communicate with each other as described herein. With at least the configuration discussed in the example of FIG. 2, the system 100 is operable to train and/or implement the multiplicative filter network 200 to learn and represent signals in fine detail and with high fidelity in a relatively fast and efficient manner.

Figure 2:
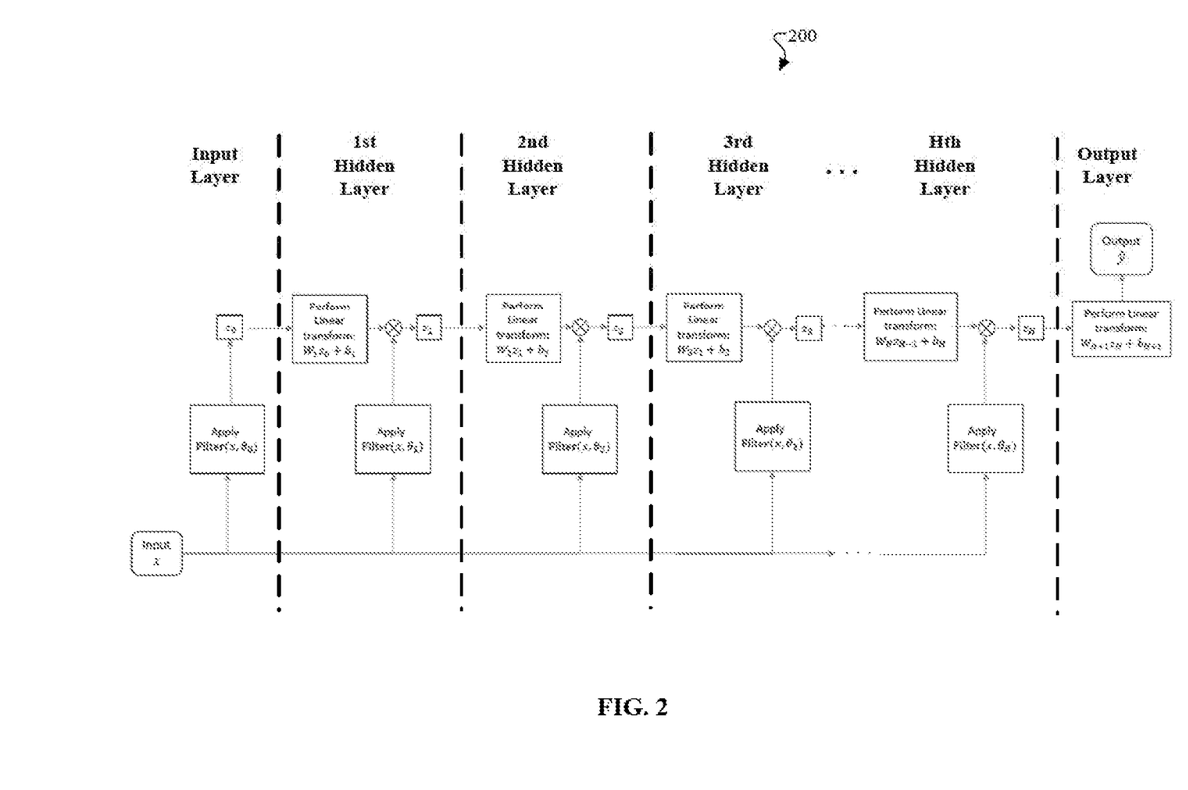
FIG. 2 is a diagram that shows an example of a neural network architecture of the multiplicative filter network of FIG. 1 according to an example embodiment of this disclosure.

FIG. 2 is a diagram relating to an example of a neural network architecture for the multiplicative filter network 200. As a concise overview, the multiplicative filter network 200, as shown in FIG. 2, is configured to perform at least the operations, which are expressed at step 1, step 2, and step 3, as indicated below:

1. $z_0 = \text{Filter}(x, \theta_0)$ [1]

2. For $i=1, \ldots, H$:

$z_i = \text{Filter}(x, \theta_i) \odot (W_i z_{i-1} + b_i)$ [2]

3. $\hat{y} = W_{H+1} z_H + b_{H+1}$ [3]

With reference to at least equation 1, equation 2, and equation 3 above, the input data is represented by 'x.' For instance, as non-limiting examples, the input data (x) may include spatial coordinates or spatial-temporal coordinates. The total number of hidden layers is represented by 'H,' which is an integer number greater than 1. In addition, the index 'i' refers to a specific hidden layer of that same number. As a non-limiting example, the index i=2 is used to refer to the second hidden layer. Also, although distinct from the hidden layers, the input layer may correspond to the index i=0 and the output layer may correspond to the index i=H+1. Also, the output data is represented by ŷ. As a non-limiting example, the output data (ŷ) refers to a quantity of interest (e.g., pixel value) at the spatial coordinates or spatial-temporal coordinates specified by the input data (x). In addition, the network parameters are represented as $\{\theta_0, \ldots, \theta_H, W_1, \ldots, W_{H+1}, b_1, \ldots, b_{H+1}\}$.

Furthermore, although the filter is configured to activate the same filter function at every hidden layer (and the input layer), the filter may provide a different transformation of the input data (x) at each hidden layer (and also at the input layer) as the parameters associated with each hidden layer (and the input layer) may be different, as denoted by the subscripts (or the index i). In general, the filter is configured to activate a filter function, which involves at least a periodic function to be able to detect features and provide feature maps, thereby enabling signals to be represented with high fidelity.

As one example, the filter is configured to activate a filter function, which involves at least a periodic function, as expressed in equation 4 below. In this first example, the filter function is a sinusoidal function. In equation 4, the network parameters are represented as $\theta_i = \{U_i, c_i\}$. This filter function is advantageous in transforming the input data (x) into a representation in the frequency domain. This transformation may be similar to the Fourier transform. For example, this transformation may be similar to at least a real or complex part of the Fourier transform.

$\text{Filter}(x, \theta_i) := \sin(U_i x + c_i)$ [4]

Alternatively, as another example, the filter is configured to activate a filter function, which involves at least a periodic function, as expressed in equation 5 below. In this second example, the filter function is a multiplicative product of a first term and a second term. The first term includes a sinusoidal function. The second term includes an exponential function. More specifically, in equation 5, the operator ⊙ represents a Hadamard product such that the filter function is a Hadamard product of the first term and the second term. In equation 5, the network parameters are represented as $\theta_i = \{U_i, c_i, \mu_i, \sigma_i\}$. This filter function is advantageous in transforming the input data (x) into a representation in the frequency domain. This transformation may be similar to that of the Fourier transform as applied with a linear filter, such as a Gabor filter.

$$\text{Filter}(x, \theta_i) := \sin(U_i x + c_i) \odot e^{\frac{x \mu_i^T}{2\sigma_i^2}}$$ [5]

Meanwhile, FIG. 2 illustrates the multiplicative filter network 200 as a flow diagram. As shown in FIG. 2, the multiplicative filter network 200 comprises a plurality of network layers, which include at least an input layer, a number of hidden layers, and an output layer. At the onset, the input layer is configured to initialize the input data. For example, the input layer is configured to apply a filter (e.g., equation 4, equation 5, or any similar type of filter with a periodic function) to the input data (x) based on at least one initial parameter (e.g., $\theta_0$) of the input layer to generate an initial feature map ($z_0$). The input layer is configured to output the initial feature map ($z_0$). The initial feature map ($z_0$) is then provided as input to the first hidden layer.

In general, each hidden layer obtains the output from the previous network layer as input. For example, the input to the first hidden layer includes the initial feature map ($z_0$), which is output from the input layer. As another example, the input to the third hidden layer includes the second output ($z_2$), which is the resulting product that is output from the second hidden layer. Upon receiving the output ($z_{i-1}$) of the previous hidden layer, the current hidden layer (as denoted by index i) is configured to perform a linear transform of the output $z_{i-1}$ of the previous hidden layer. Each hidden layer is configured to perform a linear transform on the output $z_{i-1}$ of the previous hidden layer based on a subset of the set of parameters, which are associated with that hidden layer. For example, the third hidden layer is configured to perform a linear transform on the second output ($z_2$) based on a subset e.g., ($W_3$, $b_3$) of the set of parameters (e.g., $\theta_3$, $W_3$, $b_3$) for that third hidden layer. This linear transformation is advantageous in providing the respective feature map in a more suitable form. For example, the third hidden layer performs a linear transform of the second output ($z_2$) upon receiving that second output ($z_2$) from the second hidden layer. The linear transform of the output ($z_{i-1}$) of the previous hidden layer is then used as one of the operands of a multiplicative operation for the current hidden layer. The product from this multiplicative operation generates the output ($z_i$) for the current hidden layer.

In addition, each hidden layer applies the filter to the input data (x) based on a subset (e.g., $\theta_i$), of its set of parameters (e.g., $\theta_i$, $W_i$, $b_i$) to generate a corresponding feature map. For example, the third hidden layer applies the filter to the input data (e.g. x) based on a subset (e.g., $\theta_3$), of a set of parameters (e.g., $\theta_3$, $W_3$, $b_3$), which are associated with the third hidden layer. Based on this application of the filter, the third hidden layer generates a third feature map for the third hidden layer. The current feature map of the current hidden layer is used as the other operand of a multiplicative operation to generate the output for that hidden layer.

After generating the operands as discussed above, the current hidden network layer is configured to perform an activation function. The activation function includes a multiplicative operation on the first operand (e.g., the linear transform of the output of the previous hidden layer) and the second operand (e.g., the current feature map). For example, the multiplicative operation involves the Hadamard product (or an elementwise product) for these two operands, which are vectors. In equations 2 and 5, the operator ⊙ represents a Hadamard product. As an alternative representation, in FIG. 2, the symbol ⊗ represents this same multiplicative operation of the Hadamard product. The multiplicative operation results in a current product, which becomes the output ($z_i$) of the current hidden layer and which serves as input to the next hidden layer. As an example, for the third hidden layer, the Hadamard product of the linear transform of the output $z_2$ (e.g., "first operand") and the third feature map (e.g. "second operand") is computed. In this regard, the third feature map is generated by applying the filter to the input data (x) based on a subset (e.g., $\theta_3$) of the set of parameters (e.g., $\theta_3$, $W_3$, $b_3$), for that third hidden layer. In this case, the resulting product ($z_3$) is output from the third hidden layer and passed onto the next network layer (e.g., a fourth hidden layer or the output layer).

Next, after progressing through each hidden layer for all of the 'H' hidden layers, the multiplicative filter network 200 is configured to provide the output ($z_H$) of the last hidden layer as input to the output layer. The output layer is configured to perform a linear transform on the output ($z_H$) to generate a final linear transform, which is output by the multiplicative filter network 200 as the output data ($\hat{y}$). In addition, in some cases, the output data ($\hat{y}$) may be used to update the network parameters (e.g., $\theta_i$, $W_i$, $b_i$) of the multiplicative filter network 200. As described above, this neural network architecture and multiplicative filter approach is advantageous in providing a linear combination of transformations, which has an intuitive interpretation in the field of signal processing. Accordingly, as set forth above, the multiplicative filter network 200 is configured and enabled to represent signals in fine detail and with high fidelity.

Additionally or alternatively to the embodiments described above and illustrated in at least FIG. 2, the multiplicative filter network 200 may include various additions, modifications, or the like. For example, some embodiments may include at least one additional activation function or at least one additional network layer after the final linear transform is performed on the output $z_H$ and/or after the output layer outputs the output data ($\hat{y}$). Furthermore, it is recognized that various modifications can be made to the multiplicative filter network 200 to improve its performance including a number of the usual modifications, such as a dropout process, a batch normalization process, an L2 regularization process, or any other suitable machine learning modification and/or variation. Furthermore, once trained, the multiplicative filter network 200 may be deployed and/or employed by the system 100 or another system 300 (FIG. 3), as discussed in the following non-limiting examples and applications. In addition, the system 300 may be applied to other applications, which are not specifically discussed herein.

Figure 3:
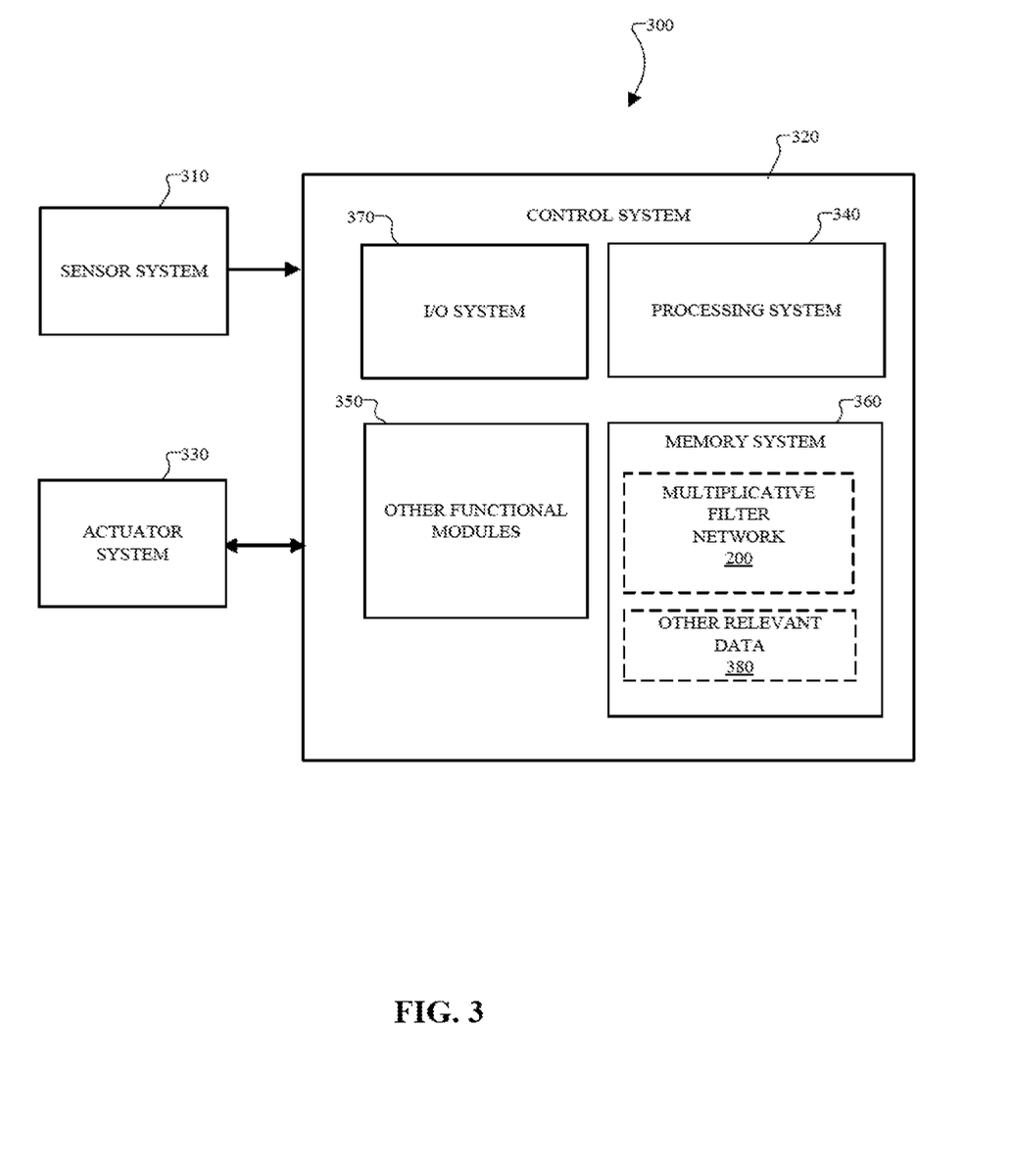
FIG. 3 is a diagram of an example of a system that employs the multiplicative filter network according to an example embodiment of this disclosure.

FIG. 3 is a diagram of a system 300, which is configured to implement and/or employ at least a trained multiplicative filter network 200. The system 300 is configured to also include at least a sensor system 310, a control system 320, and an actuator system 330. The system 300 is configured such that the control system 320 controls the actuator system 320 based on sensor data from the sensor system 310. More specifically, the sensor system 310 includes one or more sensors and/or corresponding devices to generate sensor data. For example, the sensor system 310 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), an optical sensor, an audio sensor, any suitable sensor, or any combination thereof. Upon obtaining detections of its environment, the sensor system 310 is operable to communicate with the control system 320 via an input/output (I/O) system 130 and/or other functional modules 350, which includes communication technology.

The control system 320 is configured to obtain the sensor data directly or indirectly from one or more sensors of the sensor system 310. In this regard, the sensor data may include sensor data from a single sensor or sensor-fusion data from a plurality of sensors. Upon receiving input, which includes at least sensor data, the control system 320 is operable to process the sensor data via the processing system 140. In this regard, the processing system 340 includes at least one processor. For example, the processing system 340 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least this sensor data, the processing system 340 is configured to extract, generate, and/or obtain proper input data (e.g., spatial coordinates, spatial-temporal coordinates, etc.) for the multiplicative filter network 200. In addition, the processing system 340 is operable to generate output data (e.g., a quantity of interest) via the multiplicative filter network 200 based on communications with the memory system 120. In an example embodiment, the processing system 340 is also configured to generate enhanced images/videos from the original images based on the output data from the multiplicative filter network 200. In addition, the processing system 340 is operable to provide actuator control data to the actuator system 320 based on the output data and/or the enhanced images.

The memory system 360 is a computer or electronic storage system, which is configured to store and provide access to various data to enable at least the operations and functionality, as disclosed herein. The memory system 360 comprises a single device or a plurality of devices. The memory system 360 includes electrical, electronic, magnetic, optical, semiconductor, electromagnetic, any suitable memory technology, or any combination thereof. For instance, the memory system 360 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 320 and/or processing system 140, the memory system 360 is local, remote, or a combination thereof (e.g., partly local and partly remote). For example, the memory system 360 is configurable to include at least a cloud-based storage system (e.g. cloud-based database system), which is remote from the processing system 340 and/or other components of the control system 320.

The memory system 360 includes at least a trained multiplicative filter network 200. The multiplicative filter network 200 is configured to be implemented, executed, and/or employed via the processing system 140. The multiplicative filter network 200 includes at least the neural network architecture, as discussed and shown with respect to FIG. 2. The multiplicative filter network 200 is configured to receive or obtain input data, which includes at least spatial coordinates, spatial-temporal coordinates, or any suitable type of spatial data that is defined over the quantity of interest. In this regard, the multiplicative filter network 200 is configured to work with at least one pre-processing module to obtain and extract such types of input data from the sensor data. The multiplicative filter network 200 is configured to generate output data (e.g., a quantity of interest such as pixel values) at the spatial coordinates, spatial-temporal coordinates, or any suitable type of spatial data specified by the input data.

Furthermore, as shown in FIG. 3, the system 300 includes other components that contribute to operation of the control system 320 in relation to the sensor system 310 and the actuator system 320. For example, as shown in FIG. 3, the memory system 360 is also configured to store other relevant data 230, which relates to the operation of the system 300 in relation to one or more components (e.g., sensor system 310, the actuator system 320, etc.). Also, as shown in FIG. 1, the control system 320 includes the I/O system 370, which includes one or more interfaces for one or more I/O devices that relate to the system 300. For example, the I/O system 370 provides at least one interface to the sensor system 310 and at least one interface to the actuator system 320. Also, the control system 320 is configured to provide other functional modules 350, such as any appropriate hardware technology, software technology, or any combination thereof that assist with and/or contribute to the functioning of the system 300. For example, the other functional modules 350 include an operating system and communication technology that enables components of the system 300 to communicate with each other as described herein. With at least the configuration discussed in the example of FIG. 1, the system 300 is applicable in various technologies.

Figure 4:
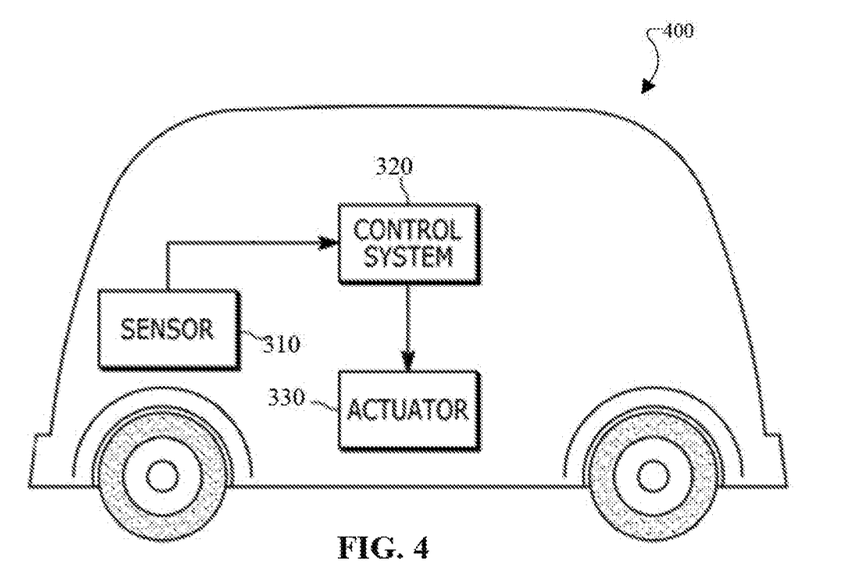
FIG. 4 is a diagram of the system of FIG. 3 with respect to mobile machine technology according to an example embodiment of this disclosure.

FIG. 4 is a diagram of the system 300 with respect to mobile machine technology 400 according to an example embodiment. As a non-limiting example, the mobile machine technology 400 includes at least a partially autonomous vehicle or robot. In FIG. 4, the mobile machine technology 400 is at least a partially autonomous vehicle, which includes a sensor system 310. The sensor system 310 includes an optical sensor, an image sensor, a video sensor, an ultrasonic sensor, a position sensor (e.g. GPS sensor), a radar sensor, a LIDAR sensor, any suitable sensor, or any number and combination thereof. One or more of the sensors may be integrated with respect to the vehicle. The sensor system 310 is configured to provide sensor data to the control system 320.

The control system 320 is configured to obtain image data, which is based on sensor data or sensor-fusion data from the sensor system 310. In addition, the control system 320 is configured to pre-process the sensor data to provide input data of a suitable form to the multiplicative filter network 200. For example, the control system 320 may be configured to provide the multiplicative filter network 200 with at least a set of spatial coordinates or spatial-temporal coordinates that relate to a part of an image/video that is missing, corrupt, and/or needs to be enhanced. In this regard, the multiplicative filter network 200 is advantageously configured to provide quantities of interest (e.g. pixel values) for any input data (e.g., spatial coordinates or spatial-temporal coordinates) including those input data that the multiplicative filter network 200 did not see during training. The multiplicative filter network 200 is able to do so because the multiplicative filter network 200 is advantageously underwent a training process to learn continuous features of images (and/or signals). In this regard, the multiplicative filter network 200 is advantageously configured to supply information (e.g., predicted pixel values) that is not otherwise available to the control system 320, for example, by being obscured, corrupted, or otherwise not detected (e.g., sensor failure, etc.).

Additionally or alternatively, the multiplicative filter network 200 is configured to predict quantities of interest (e.g., pixel values) on a mesh that contains more quantities of interest (e.g. pixel values) than the original image from which the input data was extracted. With the predicted pixel values, the control system 320 is enabled to obtain or produce a higher resolution version of the image/video. In addition, the control system 320 is configured to generate actuator control data, which is based at least on enhanced image/video that is generated from the output data of the multiplicative filter network 200. By using enhanced image/video which is based at least on the output data provided by the multiplicative filter network 200, the control system 320 is configured to generate actuator control data that allows for safer and more accurate control of the actuator system 320 of the vehicle. The actuator system 320 may include a braking system, a propulsion system, an engine, a drivetrain, a steering system, or any number and combination of actuators of the vehicle. The actuator system 320 is configured to control the vehicle so that the vehicle follows rules of the roads and avoids collisions based at least on enhanced image/video data provided by the multiplicative filter network 200 that is of higher quality than the original image/video.

Figure 5:
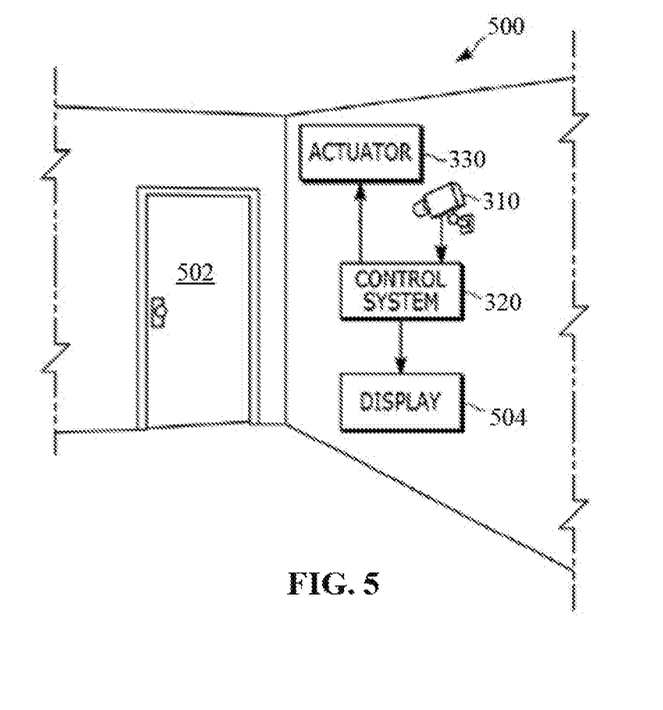
FIG. 5 is a diagram of the system of FIG. 3 with respect to security technology according to an example embodiment of this disclosure.

FIG. 5 is a diagram of the system 300 with respect to security technology 500 according to an example embodiment. As a non-limiting example, the security technology 500 includes at least a monitoring system, a control access system, a surveillance system, or any suitable type of security apparatus. For instance, as one example. FIG. 5 relates to security technology 500, which is configured to physically control a locked state and an unlocked state of a lock of the door 502 and display an enhanced image/video on the display 504. The sensor system 310 includes at least an image sensor that is configured to provide image/video data.

The control system 320 is configured to obtain the image/video data from the sensor system 310. The control system 120 is also configured to feed the multiplicative filter network 200 with at least a set of spatial coordinates or spatial-temporal coordinates of the original image/video data. Upon receiving this input data, the multiplicative filter network 200 is configured to predict pixel values for those spatial coordinates or spatial-temporal coordinates. In addition, the control system 320 is configured to enhance the original image/video by performing image reconstruction, image inpainting, image super resolution, or any combination thereof based on the predicted pixel values to provide a more complete or better quality image/video than the original image/video. In this regard, the control system 320 is configured to generate actuator control data that allows for safer and more accurate control of the actuator system 320 by using the enhanced image/video (which is based at least on the predicted pixel values provided by the multiplicative filter network 200) than by using the original image data. In addition, the control system 320 is configured to display the enhanced image/video on the display 504.

Figure 6:
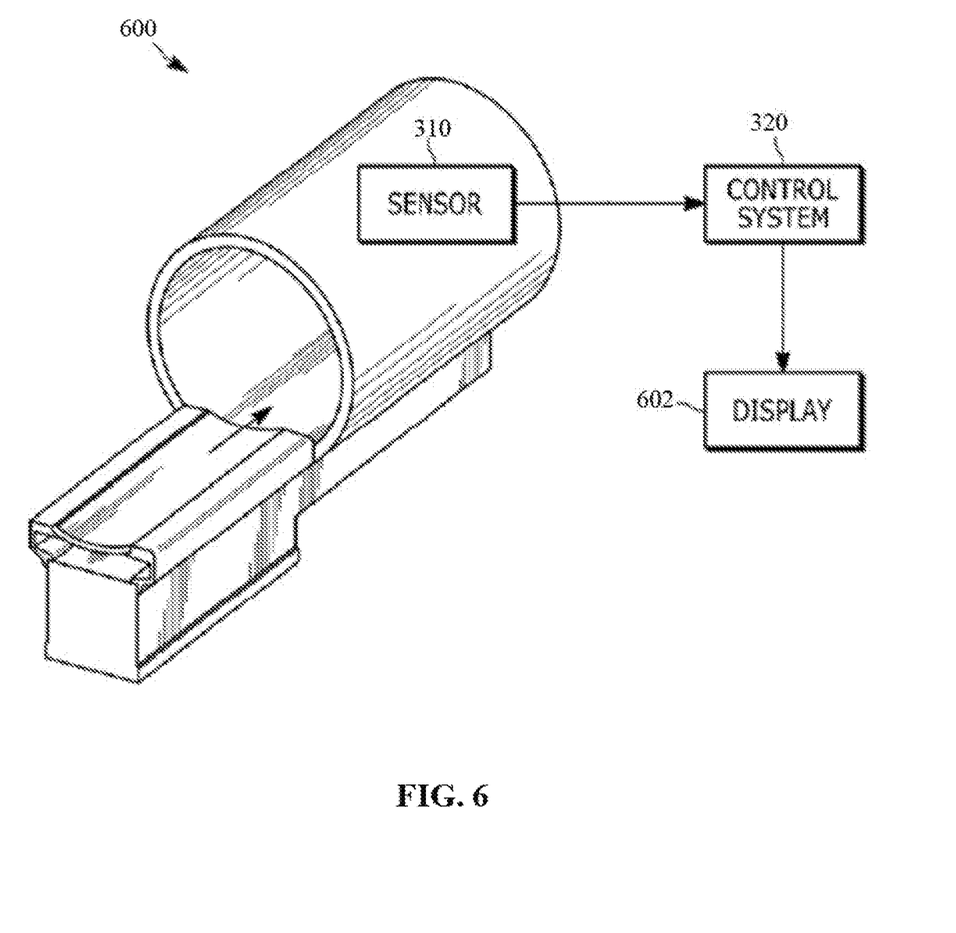
FIG. 6 is a diagram of the system of FIG. 3 with respect to imaging technology according to an example embodiment of this disclosure.

FIG. 6 is a diagram of the system 300 with respect to imaging technology 600 according to an example embodiment. As a non-limiting example, the imaging technology 600 includes a magnetic resonance imaging (MI) apparatus, an x-ray imaging apparatus, an ultrasonic apparatus, a medical imaging apparatus, or any suitable type of imaging apparatus. In FIG. 6, the sensor system 310 includes at least one imaging sensor. The control system 320 is configured to obtain image data from the sensor system 310. The control system 320 is also configured to feed the multiplicative filter network 200 with at least a set of spatial coordinates or spatial-temporal coordinates of the original image/video data. Upon receiving this input data, the multiplicative filter network 200 is configured to predict pixel values for those spatial coordinates or spatial-temporal coordinates.

In addition, the control system 320 is configured to enhance the original image/video by performing image reconstruction, image inpainting, image super resolution, or any combination thereof based on the predicted pixel values to provide a more complete or better quality image/video than the original image/video. In this regard, the control system 320 is configured to provide more accurate medical information by using the enhanced image/video (which is based at least on the predicted pixel values provided by the multiplicative filter network 200) than by using the original image/video data. In addition, the control system 320 is configured to display the enhanced image/video on the display 602.

As described herein, the embodiments provide a number of advantages and benefits. For example, the embodiments are configured to provide a technical solution to the technical problem of being able to learn and represent signals in fine detail. The embodiments are advantageously enabled to fit complicated signals, such as natural images and 3D shapes, and their derivatives robustly. More specifically, for example, in the field of image processing, the embodiments are configured to receive spatial coordinates as input data and generate pixel values at those spatial coordinates. Also, as another example, in the field of video processing, the embodiments are configured to receive spatial-temporal coordinates as input data and generate pixel values at those spatial-temporal coordinates. In addition, the embodiments are configured to learn and model audio signals. For example, the embodiments are configured to learn and represent raw audio waveforms. Also, the embodiments may be applied to reconstruction efforts and/or interpolation efforts. In addition, the multiplicative filter network 200 is configured to learn a three-dimensional (3D) representation of an object by learning a signed distance function (SDF). In this case, the multiplicative filter network 200 would take in 3D coordinates and output the signed distance to the boundary of the object (positive distance if it is inside the object, negative distance if it is outside the object, and zero distance if it is on the boundary). After the multiplicative filter network 200 is trained, then this allows for the generation of a 3D mesh that represents the object, potentially at higher resolutions than the coordinates used to train the network. In general, as discussed above, the multiplicative filter network 200 may be used in a variety of applications and/or leveraged to perform complex tasks, such as solving boundary value problems (e.g., Poisson equation, wave equation, etc.). Moreover, the configuration and the operations of the multiplicative filter network 200 provide a more concrete signal processing interpretation, which performs faster and better in various learning and representation tasks compared to other standard neural networks.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for representing signals with high fidelity, the computer-implemented method comprising:
    obtaining input data based on the sensor data, the input data including coordinates of an image;
    applying a filter to the input data based on an initial set of parameters to generate an initial feature map, wherein the filter is configured to activate a filter function that involves a periodic function;
    performing a first linear transform on the initial feature map based on a subset of a first set of parameters to generate a first linear transform;
    applying the filter to the input data based on another subset of the first set of parameters to generate a first feature map;
    performing a multiplicative operation on the first linear transform and the first feature map to generate a first product;
    performing a second linear transform on the first product based on a subset of a second set of parameters to generate a second linear transform;
    generating output data that takes into account at least the second linear transform, the output data including pixel values of the image that are at the coordinates specified by the input data; and
    generating another image based on the output data such that the another image provides information that is not provided at the coordinates of the image.

2. The computer-implemented method of claim 1, wherein:
    the initial feature map includes an initial transformation of the input data into an initial representation in a frequency domain based on the initial set of parameters; and
    the first feature map includes a first transformation of the input data into a first representation in the frequency domain based on the another subset of the first set of parameters.

3. The computer-implemented method of claim 1, wherein the periodic function is a sinusoidal function.

4. The computer-implemented method of claim 1, wherein:
    the filter function is a multiplicative product between the periodic function and an exponential function; and
    the periodic function is a sinusoidal function.

5. The computer-implemented method of claim 1, further comprising:
applying the filter to the input data based on another subset of the second set of parameters to generate a second feature map;
performing the multiplicative operation on the second linear transform and the second feature map to obtain a second product; and
performing a third linear transform on the second product based on a subset of a third set of parameters to generate a third linear transform,
wherein the generation of the output data further takes into account the third linear transform.

6. The computer-implemented method of claim 1, further comprising:
updating at least the first set of parameters and the second set of parameters based on the output data.

7. The computer-implemented method of claim 1, wherein the coordinates correspond to a part of the image that is missing or corrupt.

8. The computer-implemented method of claim 1, wherein:
the image has a first resolution;
the another image has a second resolution; and
the second resolution is greater than the first resolution.

9. The computer-implemented method of claim 1, further comprising:
generating actuator control data based on the another image; and
controlling an actuator according to the actuator control data.

10. A system comprising:
at least one sensor to provide sensor data;
one or more non-transitory computer readable storage devices that include at least (i) a machine learning system and (ii) computer readable data that is executable to perform a method involving the machine learning system; and
one or more processors operably connected to the one or more non-transitory computer readable storage devices, the one or more processors being configured to execute the computer readable data to perform the method, wherein the method includes:
obtaining input data based on the sensor data, the input data including coordinates of an image;
applying a filter to the input data based on an initial set of parameters to generate an initial feature map, wherein the filter is configured to activate a filter function that involves a periodic function;
performing a first linear transform on the initial feature map based on a subset of a first set of parameters to generate a first linear transform;
applying the filter to the input data based on another subset of the first set of parameters to generate a first feature map;
performing a multiplicative operation on the first linear transform and the first feature map to obtain a first product;
performing a second linear transform on the first product based on a subset of a second set of parameters to generate a second linear transform;
providing output data that takes into account at least the second linear transform, the output data including pixel values of the image that are at the coordinates specified by the input data; and
generating another image based on the output data such that the another image provides information that is not provided at the coordinates of the image.

11. The system of claim 10, wherein:
the initial feature map includes an initial transformation of the input data into an initial representation in a frequency domain based on the initial set of parameters; and
the first feature map includes a first transformation of the input data into a first representation in the frequency domain based on the another subset of the first set of parameters.

12. The system of claim 10, wherein the periodic function is a sinusoidal function.

13. The system of claim 10, wherein:
the filter function is a multiplicative product between the periodic function and an exponential function; and
the periodic function is a sinusoidal function.

14. The system of claim 10, wherein the method further comprises:
applying the filter to the input data based on another subset of the second set of parameters to generate a second feature map;
performing the multiplicative operation on the second linear transform and the second feature map to obtain a second product; and
performing a third linear transform on the second product based on a subset of a third set of parameters to generate a third linear transform,
wherein the generation of the output data further takes into account the third linear transform.

15. The system of claim 10, further comprising:
updating at least the first set of parameters and the second set of parameters based on the output data.

16. The system of claim 10, wherein the coordinates correspond to a part of the image that is missing or corrupt.

17. The system of claim 10, further comprising:
an actuator,
wherein,
the one or more processors are configured to execute the computer readable data to perform the method that further includes generating actuator control data based on the another image, and
the actuator is controlled according to the actuator control data.

18. A computer product comprising at least one non-transitory computer readable storage device that includes computer-readable data, which when executed by one or more electronic processors, is operable to cause the one or more electronic processors to implement a method that comprises:
obtaining input data that includes coordinates of an image;
applying a filter to the input data based on an initial set of parameters to generate an initial feature map, wherein the filter is configured to activate a filter function that involves a periodic function;
transforming the initial feature map based on a subset of a first set of parameters to generate a first linear transform;
applying the filter to the input data based on another subset of the first set of parameters to generate a first feature map;
performing a multiplicative operation on the first linear transform and the first feature map to generate a first product;

transforming the first product based on a subset of a second set of parameters to generate a second linear transform;

generating output data that takes into account at least the second linear transform, the output data including pixel values of the image that are at the coordinates specified by the input data; and generating another image based on the output data such that the another image provides information that is not provided at the coordinates of the image.

19. The computer product of claim 18, wherein:

the initial feature map includes an initial transformation of the input data into an initial representation in a frequency domain based on the initial set of parameters; and the first feature map includes a first transformation of the input data into a first representation in the frequency domain based on the another subset of the first set of parameters.

20. The computer product of claim 18, wherein the periodic function is a sinusoidal function.

21. The computer product of claim 18, wherein:

the filter function is a multiplicative product between the periodic function and an exponential function; and the periodic function is a sinusoidal function.

22. The computer product of claim 18, wherein the method further comprises:

applying the filter to the input data based on another subset of the second set of parameters to generate a second feature map;

performing the multiplicative operation on the second linear transform and the second feature map to obtain a second product; and performing a third linear transform on the second product based on a subset of a third set of parameters to generate a third linear transform, wherein the generation of the output data further takes into account the third linear transform.

23. The computer product of claim 18, wherein the coordinates correspond to a part of the image that is missing or corrupt.

* * * * *